United States Patent [19]

Marcus

[11] 4,052,124

[45] Oct. 4, 1977

[54] REARVIEW MIRROR ASSEMBLY WITH PLURALITY OF SIMULTANEOUSLY MOVABLE MIRRORS

[75] Inventor: Konrad H. Marcus, Holland, Mich.

[73] Assignee: Prince Corporation, Holland, Mich.

[21] Appl. No.: 655,688

[22] Filed: Feb. 6, 1976

[51] Int. Cl.² .............................................. G02B 5/08
[52] U.S. Cl. ...................................... 350/304; 350/292
[58] Field of Search .............. 350/304, 303, 299, 302, 350/307, 292

[56] References Cited

U.S. PATENT DOCUMENTS

| | | | |
|---|---|---|---|
| 1,946,184 | 2/1934 | Abbot | 350/299 |
| 2,471,954 | 5/1949 | Harvey | 350/292 |
| 2,536,872 | 1/1951 | Cookson | 350/304 |
| 3,704,683 | 12/1972 | Summersby | 350/299 |

FOREIGN PATENT DOCUMENTS 1,040,148  8/1966  United Kingdom ................. 350/307

*Primary Examiner*—John K. Corbin
*Assistant Examiner*—Jon W. Henry
*Attorney, Agent, or Firm*—Fisher, Gerhardt & Groh

[57] ABSTRACT

A rearview mirror assembly for motor vehicles having a plurality of like mirror sections which are supported relative to each other and interconnected so that movement of any one of the mirrors about a generally vertical pivot axis results in similar movement of the remaining mirror sections about corresponding axes so that the sections remain parallel to each other. In their adjusted position about their vertical axes, the plurality of mirror sections may be adjusted as a unit about a generally horizontal axis.

5 Claims, 3 Drawing Figures

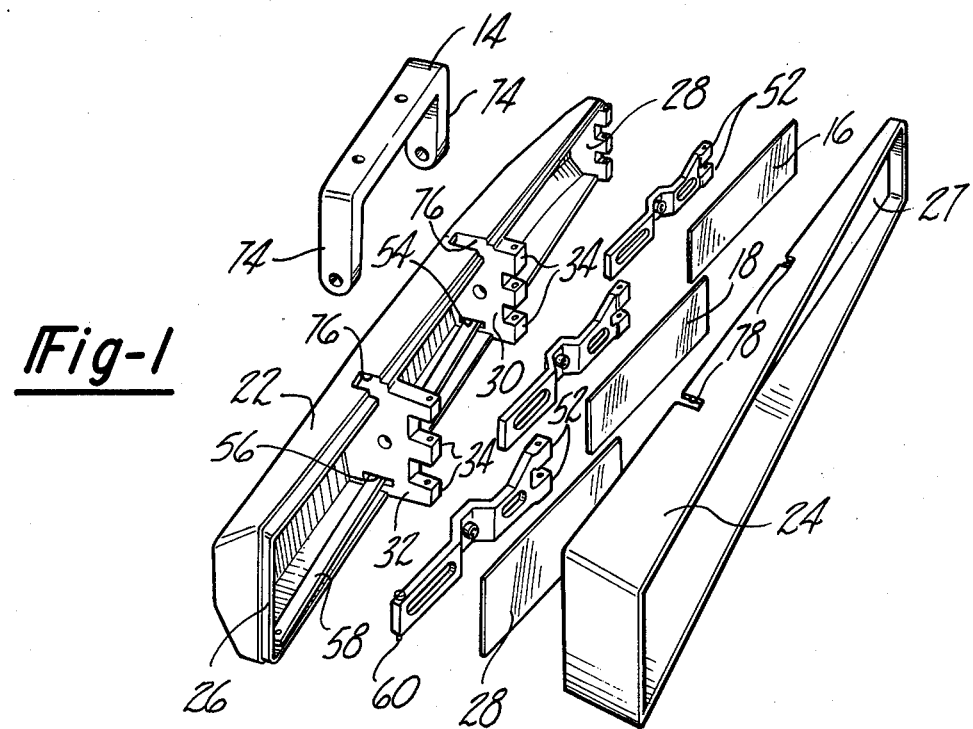

REARVIEW MIRROR ASSEMBLY WITH PLURALITY OF SIMULTANEOUSLY MOVABLE MIRRORS

This invention relates to rearview mirrors for vehicles and more particularly to a multiple mirror arrangement which is adjustable to view a relatively wide area to the rear of the vehicle.

Heretofore, rearview mirrors for vehicles and particularly those located within the passenger compartment, have been limited in width because of the necessity for adjusting the mirrors about a generally vertical axis. An excessively wide mirror prevents a full range of such adjustment because of interference of the mirror with the windshield and surfaces defining the passenger compartment.

It is an object of this invention to provide a mirror assembly in which a plurality of mirrors are mounted in side by side relationship so that adjustment of any one of the mirrors about a substantially vertical axis results in identical adjustment of the remaining mirrors.

Still another object of the invention is to provide a rearview mirror for vehicles having multiple mirror sections which may be adjusted simultaneously about a generally vertical and horizontal axis.

Another object of the invention is to provide a mirror assembly for vehicles in which a plurality of mirrors are adjustable relative to each other about generally horizontal axes and thereafter, repositioning of any one of the mirrors about a vertical axis results in like positioning of the remaining mirrors to maintain them in generally parallel relationship with each other.

The multiple mirror assembly includes a plurality of mirror sections disposed in side by side relationship to that the mirrors may be adjusted separately and independently of each other about a generally horizontal axis. The mirrors are each supported about a separate vertical axis and are interconnected so that movement of any one of the mirrors about its vertical axis results in like movement of the remaining mirrors so that the mirror sections remain substantially parallel to each other. The mirrors also may be adjusted simultaneously and as a unit to change the angle of the mirrors relative to the vehicle about a generally horizontal axis. The arrangement is such that a very wide mirror assembly may be provided to increase the field of view at the rear of a vehicle.

FIG. 1 is an exploded perspective view of the rearview mirror assembly embodying the invention;

FIG. 2 is a top cross-sectional view of the mirror assembly; and

FIG. 3 is a view of the mirror assembly as it appears in a drivers compartment of a vehicle.

The mirror assembly embodying the invention is designated generally at 10 and includes a housing 12 which is supported by means of a bracket 14 to the ceiling of the passenger compartment of a vehicle, preferably adjacent the windshield so that a plurality of mirrors 16, 18 and 20 have their reflective surfaces facing rearwardly of the vehicle.

The housing 12 includes a support structure 22 which is generally elongated and a cowl 24 which fits over and engages a lip 26 forming a frame on the support 22. The support 22 is preferably a die casting and the cowl 26 may be of plastic with both the support 22 and cowl 24 textured and colored to match and compliment the interior or the passenger compartment. The cowl 24 is generally wedge shaped to be wider at one end than the other and forms an opening 27 to the housing 12 which exposes the reflective surfaces of the mirrors 16, 18 and 20.

The support structure 22 forms an end wall 28, an intermediate wall 30 and another intermediate wall 32. Each of the walls 28, 30 and 32 is provided with projections 34 which have aligned openings 36 for receiving pins 38, 40 and 42. The pins are spaced from the rear wall 43 of the support structure 22 progressively greater distances so that the pins 38, 40 and 42 are disposed in an imaginary common plane which extends at an angle to the frame portion formed by the lip 26 with the pin 38 being closest and the pin 42 being farthest from the lip.

Mounted on the pins 38, 40 and 42 are bracket members 44, 46, 48, respectively. The bracket members are generally indentical to each other and each has a bifurcated end portion with furcations 52 adapted to be received between the projections 34 and having openings to receive the pins 38, 40 and 42. The pins form pivot axes for swinging movement of the bracket members 44, 46 and 48.

The intermediate walls 30 and 32 are provided with slots 54 and 56 which are adapted to receive an elongated connector bar 58 which is free to slide in the slots 54 and 56. Each of the bracket members 44, 46 and 48 is provided with a pin 60 which is adapted to be fastened to the connector bar 58. The pins 60 each afford pivotal movement of the respective bracket relative to the connector bar 58 and as a result, movement of any one of the brackets 44, 46 or 48 causes movement of the remaining brackets. The spacing between the pins 38, 40 and 42 and the respective pivot pins 60 is equal so that movement of any one of the brackets 44, 46 or 48 results in identical movement of the remaining brackets to maintain the brackets parallel to each other for all angularly adjusted positions.

The mirrors are generally rectangular and of identical size having a reflective surface 64 which is exposed within the opening 27 of the housing 12. The mirrors 16, 18 and 20 are mounted on the brackets 44, 46 and 48, respectively, by means of a ball joint arrangement which includes a ball element 68 fastened to the rear surface of the mirrors 16, 18 and 20 in any conventional manner as by an adhesive, for example. The ball elements 68 are received in socket members 70, one of which is mounted centrally on each of the bracket members 44, 46 and 48. In the assembled condition, the longer edges of the mirrors 16, 18 and 20 are adjacent to the inner surfaces of the cowl 24 so that the mirrors are prevented from rotational movement or tilting in their own plane about the axis of the ball and socket joint 66. However, each of the mirrors 16, 18 and 20 may be adjusted relative to its respective bracket 44, 46 and 48 about an axis extending generally parallel to the elongated bracket members and transverse to the pivot pins 38, 40 and 42. As a result, the mirrors may be adjusted independently of each other about a generally horizontal axis.

The mirror housing including the support 22 and cowl 24 with the contained mirrors 16, 18 and 20 are supported as a unit to the ceiling of a vehicle by means of the bracket 14. The bracket 14 is generally U-shaped and has a pair of legs 74 which extend into the housing 12 through slots 76 in the support 22 and mating slots 78 in the cowl 24. The free ends of the legs 74 are pivotally connected to the intermediate walls 30 and 32 of the support 22 by means of pins 80 which afford a horizontal axis on which the housing 12 may be adjusted relative to the bracket 14.

To adjust the mirror for use in a vehicle, each of the mirrors may be separately and independently adjusted about a generally horizontal axis formed by the ball and socket elements 66 and 68. Thereafter all of the mirrors may be adjusted as a unit about a generally horizontal axis by moving the entire housing 12 relative to its supporting bracket 14. To adjust the lateral field of the mirrors 16, 18 and 20, it is sufficient to move any one of the mirrors about its vertical axis formed by one of the pins 38, 40 or 42. Such movement of any one mirror results in like movement of the remaining mirrors and they remain parallel to each other. Change of the parallel positioning of the mirrors does not effect the individual positioning of the mirrors about their horizontal axes afforded by the ball and socket elements 66 and 68 or the adjustment of the mirrors as a unit about their horizontal axis formed by the pins 80.

A multiple section mirror has been provided in which the mirrors are positioned in side by side relationship to afford a relatively wide lateral field of view rearwardly of a vehicle and the mirrors are so arranged that adjustment of any one of the mirrors about its vertical axis to change the lateral angle of view, simultaneously and identically changes the position of the remaining mirror sections. Provison also is made for adjusting each of the mirrors about a generally horizontal axis independently of the remaining mirrors and to simultaneously adjust all of the mirrors of the assembly as a unit about another horizontal axis.

The embodiments of the invention in which an exclusive property or privilege is claimed are defined as follows:

1. A rearview mirror assembly comprising; a support member, a plurality of mirrors, a plurality of mounting means connecting said plurality of mirrors, respectively, to said support member for movement relative thereto about separate pivot axes disposed generally vertically, the pivot axes of said mirrors being disposed in spaced parallel relation to each other, and means connecting said mirrors to each other so that movement of one mirror relative to said support member results in simultaneous movement of the remaining mirrors in the same direction about their respective axes, and a bracket member adapted for mounting on a vehicle and means connecting said support member to said bracket member for movement of said support member relative to said bracket member about a generally horizontal axis.

2. The combination of claim 1 in which said plurality of mirrors is supported on a plurality of brackets, respectively, and said brackets are mounted on said support member for movement about said pivot axes.

3. A rearview mirror assembly comprising; a support member, plurality of mirrors each having planar faces, a plurality of mounting means connecting said plurality of mirrors, respectively, to said member for movement relative thereto about separate pivot axes, the pivot axes of said mirrors being disposed in spaced parallel relation to each other, and means connecting said mirrors to each other so that movement of one mirror relative to said support member results in simultaneous movement of the remaining mirrors in the same direction about their respective axes, said plurality of mirrors being supported on a plurality of brackets, respectively, and said brackets being mounted on said support member for movement about a pivot means connecting said plurality of mirrors to said plurality of brackets, respectively, for movement of each mirror about an axis normal to the pivot axis of the corresponding mounting means and independently of the remaining mirrors, said support member having opposed parallel surfaces for abutting the opposite edges of said mirrors to prevent tilting of said mirrors in planes including said planar faces.

4. The combination of claim 3 in which said support member is a housing containing said mirrors and in which said mirrors are exposed at one side of said housing.

5. A rearview mirror assembly comprising; a support member, a plurality of mirrors each having planar faces, a plurality of mounting means connecting said plurality of mirrors, respectively, to said support member for movement relative thereto about separate pivot axes, the pivot axes of said mirrors being disposed in spaced parallel relation to each other, and means connecting said mirrors to each other so that movement of one mirror relative to said support member results in simultaneous movement of the remaining mirrors in the same direction about their respective axes, said support member being a housing containing said mirrors and said mirrors being exposed at one side of said housing, a bracket member adapted for mounting on a vehicle, said housing being pivotally mounted to said bracket for movement relative thereto about a generally horizontal axis.

* * * * *